United States Patent Office 2,772,170
Patented Nov. 27, 1956

2,772,170

ANTIOXIDANT COMPOSITION

Lloyd A. Hall, Chicago, Ill., assignor to The Griffith Laboratories, Inc., a corporation of Illinois No Drawing. Application November 23, 1953,
Serial No. 393,948

11 Claims. (Cl. 99—163)

This invention relates to an antioxidant composition containing fatty monoglyceride citrate, propyl gallate, and water.

As disclosed in my copending application Serial No. 393,950, filed November 23, 1953, citric acid may be rendered fat soluble without destroying in any way the value of the citric acid as a synergist or as a metal sequestering agent by reacting it under proper conditions with fatty monoglycerides. This next compound may then be combined with propyl gallate to serve as an excellent fat soluble and water miscible antioxidant which can be readily introduced to the fat.

I have discovered that the stability of the fatty monoglyceride citrate-propyl gallate mix disclosed in my copending application Serial No. 393,950, filed November 23, 1953, is materially improved by the addition of a minor proportion of water. When small amounts of water are added either to the fatty monoglyceride citrate-propyl gallate mix or to the mix incorporated in an edible oil, the resultant composition is characterized by a high degree of clarity and unexpected and excellent resistance to sedimentation.

By a minor proportion of water, I mean amounts from about 0.5% up to about 2.5% of the weight of the combined antioxidant composition in an edible oil, with the amount of fatty monoglyceride citrate-propyl gallate mix constituting from about 17 to 42.5% of the weight of the combined antioxidant composition in an edible oil.

The fatty monoglycerides are, of course, well known as emulsifying or dispersing agents. However, as disclosed in my copending application Serial No. 393,950, filed November 23, 1953, they form a new reaction product with citric acid, fatty monoglyceride citrate. The existence of this new compound has been shown definitely by X-ray studies. Microanalysis of the material shows complete absence of citric acid.

The term "fatty monoglyceride" has been employed to cover monoglycerides of the higher fatty acids, particularly those with ten or more carbon atoms. Preferably, of course, the glycerides are of fatty acids of the order of eighteen carbon atoms. The fatty acids need not be saturated.

The preferred monoglyceride actually employed has the following characteristics:

*Average chemical and physical data*

Cottonseed monoglyceride:
  Monoester content_____ 90.0% (minimum).
  Saponification value_____ 150–160.
  Iodine value_____ 80–90.
  Glycerol content_____ 1.0% (maximum).
  F. F. A. (as oleic)_____ 1.5% (maximum).
  Specific gravity_____ 0.96 @ 60° C.
  Melting point_____ 45–50° C.

Other monoglycerides that may be used have the following characteristics:

Lard monoglyceride:
  Monoester content_____ 90.0% (minimum).
  Saponification value_____ 160–170.
  Iodine value_____ 45–55.
  Glycerol content_____ 1.0% (maximum).
  F. F. A. (as oleic)_____ 1.5% (maximum).
  Specific gravity_____ 0.96 @ 60° C.
  Melting point_____ 50–60° C.

Hydrogenated lard monoglyceride:
  Monoester content_____ 90.0% (minimum).
  Saponification value_____ 160–170.
  Iodine value_____ 3 (maximum).
  Glycerol content_____ 1.0% (maximum).
  F. F. A. (as stearic)____ 1.5% (maximum).
  Specific gravity_____ 0.96 @ 75° C.
  Melting point_____ 70° C., 158° F. (approx.).

As an example of making the water fortified fatty monoglyceride citrate-propyl gallate antioxidant composition, anhydrous citric acid was added to cottonseed monoglyceride previously heated to 265–275° F. The mix was agitated moderately for 1½ hours at which time reaction was substantially complete. During this period the temperature was maintained from about 265–275° F. Propyl gallate was then added to the resulting fatty monoglyceride citrate solution at 255–265° F. with vigorous agitation for 6–10 minutes. The heat was cut off, and the agitation reduced to a moderate stir. During this moderate stirring period of about 25–30 minutes, the temperature decreased to 210–220° F., at which time the propyl gallate was substantially dissolved. Water was then added to this mixture at 195–205° F. and the resulting mixture agitated for 15 minutes, by which time the water was completely dissolved. Corn oil was added to the mixture at 195–205° F. and agitated 10–15 minutes until the corn oil and the water fortified fatty monoglyceride citrate-propyl gallate formed a substantially clear solution.

A preferred formulation produced according to this procedure was:

|  | Percent |
|---|---|
| Cottonseed monoglyceride | 30.0 |
| Anhydrous citric acid | 5.0 |
| Propyl gallate | 6.5 |
| Water | 0.5 |
| Corn oil | 58.0 |
| Total | 100.0 |

In a modified procedure for preparing the water fortified antioxidant-edible oil solution, crystalline citric acid is added to cottonseed monoglyceride previously heated to 265–275° F., and the mix agitated moderately for 1½ hours, when substantially complete reaction had taken place. Propyl gallate was added at 255–265° F., with vigorous agitation for 6–10 minutes, at which time the heat was removed, and the agitation reduced to a moderate stir. During this moderate stirring the temperature decreased gradually to 210–220° F. over a period of 25–30 minutes, at the end of which period the propyl gallate was dissolved. Corn oil was added to the fatty monoglyceride citrate-propyl gallate mix at 200–210° F. followed by agitation of 5–10 minutes, the temperature decreasing gradually during the dissolving of the corn oil to 135–145° F. Water was added to the mixture at this temperature and the resultant mix agitated moderately for 15 minutes until a substantially clear solution occurred.

A preferred formulation produced according to this procedure was:

| | Percent |
|---|---|
| Cottonseed monoglyceride | 30.0 |
| Crystalline citric acid | 5.0 |
| Propyl gallate | 6.5 |
| Corn oil | 57.75 |
| Water | 0.75 |
| Total | 100.0 |

When the fatty monoglyceride citrate-propyl gallate antioxidant composition is incorporated into an edible oil, I have discovered that the stability of the resultant mixture is still further improved by adding the water after the edible oil is added to the fatty monoglyceride citrate-propyl gallate mix.

Either anhydrous or crystalline citric acid can be employed to form the fatty monoglyceride citrate, the end products formed therefrom behaving in identical fashion. The monohydrate $C_6H_8O_7 \cdot H_2O$ containing 8.58% $H_2O$ of crystallization was used.

Fatty monoglyceride and citric acid may be reacted at a temperature range of from about 220–300° F. Prolonged heating of the mix above 300–310° F. is destructive to the fatty monoglyceride citrate and below 220° the product formed is unstable. An alternative to the preferred conditions of 265–275° F. with 1½ hours agitation set forth above is a temperature of 245–260° F. with moderate agitation for 3 hours.

Prolonged agitation of the fatty monoglyceride-propyl gallate mix produces an opaque solution which will result in sedimentation. To prevent this opaqueness, agitation should be limited to not more than about 30 minutes at 260–265° F., or to not more than about 55 minutes at 230–240° F.

Other formulations have been prepared using the procedures hereinbefore stated for incorporating water and employing proportions:

| | Percent | Percent | Percent | Percent | Percent |
|---|---|---|---|---|---|
| Cottonseed Monoglyceride | 30.0 | 30.0 | 30.0 | 30.0 | 30.0 |
| Citric Acid | 5.0 | 5.0 | 5.0 | 5.0 | 5.0 |
| Propyl Gallate | 6.5 | 6.5 | 6.5 | 6.5 | 6.5 |
| Corn Oil | 58.5 | 57.5 | 57.0 | 56.5 | 56.0 |
| Water | | 1.0 | 1.5 | 2.0 | 2.5 |
| Total | 100.0 | 100.0 | 100.0 | 100.0 | 100.0 |

| | Percent | Percent |
|---|---|---|
| Cottonseed Monoglyceride | 22.0 | 22.0 |
| Citric Acid | 5.0 | 5.0 |
| Propyl Gallate | 6.5 | 6.5 |
| Water | 2.0 | 2.5 |
| Corn Oil | 64.5 | 64.0 |
| Total | 100.0 | 100.0 |

Other vegetable or animal oils may be employed. Selection of an animal as against a vegetable oil normally will be determined by the product in which the material is to be employed.

As disclosed in my copending application Serial No. 393,950, filed November 23, 1953, a combination of antioxidants may be employed, such as propyl gallate and "BHA" (butylated hydroxyanisole), in the preparation of an edible oil-antioxidant composition that has excellent resistance to oxidation, thereby avoiding rancidity.

The procedures for preparing such edible oil mixtures, fortified by water, are substantially the same as those outlined above for use with propyl gallate alone as the antioxidant. Instead of adding edible oil, it is preferred to add a "BHA" concentrate to the fatty monoglyceride citrate-propyl gallate-water mix.

The "BHA" concentrate is prepared by dissolving "BHA" in an edible oil such as corn oil at 120–130° F., followed by stirring for 25 to 30 minutes.

As an example of preparing the combined antioxidant composition fortified with water, anhydrous citric acid was added to cottonseed monoglyceride previously heated to 245–260° F. and the mix agitated moderately for 3 hours at which point the reaction was substantially complete. The heat was turned off and propyl gallate was sifted through a 10 mesh sieve directly into the reaction product at 245–260°. The new mixture was agitated moderately for 45 minutes with the temperature being maintained at 210–225° F. at which point the propyl gallate was dissolved. Water was added to the fatty monoglyceride citrate-propyl gallate mixture at 195–210° F. and agitated for 5 minutes. "BHA" concentrate was added to the water fortified mixture at 195–210° and agitated 10–15 minutes until a substantially clear solution resulted.

A preferred formulation employed in the above procedure was:

| | Percent |
|---|---|
| Cottonseed monoglyceride | 25.0 |
| Anhydrous citric acid | 5.0 |
| Propyl gallate | 6.5 |
| Water | 0.5 |
| "BHA" concentrate | 64.5 |
| Total | 100.0 |
| "BHA" concentrate: | |
| "BHA" | 11.0 |
| Corn oil | 53.5 |
| | 64.5 |

In another example of preparing the water fortified combined antioxidant-edible oil, crystalline citric acid was added to cottonseed monoglyceride previously heated to 265–275° F. and the mix agitated moderately for 1½ hours until substantially complete reaction occurred. Propyl gallate was added at 255–265° F. with vigorous agitation for 6–10 minutes. The agitation was reduced to a moderate stir, without application of heat, and the temperature gradually decreased to 210–220° F. over a period of 25–35 minutes.

"BHA" concentrate at a temperature of 110°–115° F., prepared by dissolving "BHA" in corn oil at a temperature of 120–130° F. was added to the fatty monoglyceride citrate-propyl gallate mixture at a temperature of 210–220° F. and agitated 5–10 minutes, at which point the "BHA" concentrate was dissolved. Water was added over a period of approximately 3–5 minutes, followed by stirring moderately for 15 minutes until a clear solution resulted.

A preferred formulation used in this procedure is as follows:

| | Percent |
|---|---|
| Cottonseed monoglyceride | 26.0 |
| Crystalline citric acid | 5.0 |
| Propyl gallate | 5.0 |
| "BHA" concentrate | 63.5 |
| Water | 0.5 |
| | 100.0 |
| "BHA" concentrate: | |
| "BHA" | 11.0 |
| Corn oil | 52.5 |
| | 63.5 |

Other formulations have been prepared using the same procedures for incorporating water as outlined above and employing the following proportions:

| | Percent | Percent | Percent | Percent |
|---|---|---|---|---|
| Cottonseed Monoglyceride | 18.0 | 18.0 | 22.0 | 22.0 |
| Anhydrous Citric Acid | 4.0 | 4.0 | 5.0 | 5.0 |
| Propyl Gallate | 5.0 | 5.0 | 5.0 | 5.0 |
| Water | 2.0 | 2.5 | 1.0 | 2.0 |
| "BHA" Concentrate | 71.0 | 70.5 | 67.0 | 66.0 |
| Total | 100.0 | 100.0 | 100.0 | 100.0 |

| "BHA" Concentrate: | Percent | Percent | Percent | Percent |
|---|---|---|---|---|
| "BHA" | 11.0 | 11.0 | 11.0 | 11.0 |
| Corn Oil | 60.0 | 58.0 | 56.0 | 55.0 |
| Total | 71.0 | 69.0 | 67.0 | 66.0 |

| | Percent | Percent | Percent | Percent | Percent |
|---|---|---|---|---|---|
| Cottonseed Monoglyceride | 26.0 | 26.0 | 26.0 | 26.0 | 26.0 |
| Anhydrous Citric Acid | 5.0 | 5.0 | 5.0 | 5.0 | 5.0 |
| Propyl Gallate | 5.0 | 5.0 | 5.0 | 5.0 | 5.0 |
| Water | | 1.0 | 1.5 | 2.0 | 2.5 |
| "BHA" Concentrate | 64.0 | 63.0 | 62.5 | 62.0 | 61.5 |
| Total | 100.0 | 100.0 | 100.0 | 100.0 | 100.0 |

| "BHA" Concentrate: | Percent | Percent | Percent | Percent | Percent |
|---|---|---|---|---|---|
| "BHA" | 11.0 | 11.0 | 11.0 | 11.0 | 11.0 |
| Corn Oil | 53.0 | 52.0 | 51.5 | 51.0 | 50.5 |
| Total | 64.0 | 63.0 | 62.5 | 62.0 | 61.5 |

In each of the above formulations, the degree of clarity and resistance to sedimentation were markedly improved over similar formulations which did not contain water. The optimum results were obtained with formulations employing 1% water.

Water may be used to fortify the fatty monoglyceride citrate mixes disclosed in my copending application Serial No. 393,950, filed November 23, 1953, wherein the following proportions of mixes were disclosed:

| | Percent | Percent | Percent |
|---|---|---|---|
| Cottonseed Monoglyceride | 10.000 | 15.000 | 20.000 |
| Citric Acid | 3.735 | 3.735 | 3.735 |
| Propyl Gallate | 3.335 | 3.335 | 3.335 |
| | 17.07 | 22.07 | 27.07 |

| | Percent | Percent | Percent |
|---|---|---|---|
| Cottonseed Monoglyceride | 18.0 | 15.0 | 27.0 |
| Citric Acid | 5.0 | 5.0 | 9.0 |
| Propyl Gallate | 3.34 | 3.34 | 6.5 |
| | 26.34 | 23.34 | 42.5 |

The 17.07% formulation appears to be the minimum concentration of antioxidant, sedimentation appearing in the edible oil when lower concentrations of antioxidant are used. Antioxidant concentrations in excess of 42.5% cause the fortified edible oil to become cloudy upon standing for several days.

The foregoing detailed description has been given for clearness of understanding only and no unnecessary limitations should be understood therefrom as modifications will be obvious to those skilled in the art.

I claim:

1. An antioxidant composition comprising a clear solution in an edible oil of fatty monoglyceride citrate, propyl gallate and about 0.5 to 2.5% of added water.

2. An antioxidant composition comprising a clear solution in an edible oil of fatty monoglyceride citrate, propyl gallate, butylated hydroxyanisole and about 0.5 to 2.5% of added water.

3. An antioxidant composition comprising a clear solution in an edible oil of fatty monoglyceride citrate, propyl gallate, and added water, the proportion of added water being about 0.5 to 2.5% by weight of the antioxidant composition.

4. The antioxidant of claim 3 including butylated hydroxyanisole.

5. An antioxidant composition comprising a clear solution in an edible oil of from about 17–42½% by weight of the composition of fatty monoglyceride citrate-propyl gallate mixture, and from about 0.5% to about 2.5% by weight of the composition of added water.

6. The composition of claim 5 wherein the edible oil contains a minor proportion of butylated hydroxyanisole.

7. The method which comprises mixing propyl gallate with fatty monoglyceride citrate at a temperature of from about 230–265° F., agitating the resulting mix until the propyl gallate is substantially completely dissolved, adding about 0.5 to 2.5% of water to the fatty monoglyceride citrate-propyl gallate mix, and agitating until the water is substantially completely dissolved thereby forming a clear solution.

8. The method which comprises mixing propyl gallate with fatty monoglyceride citrate at a temperature of from about 230–265° F., agitating the resulting mixture until the propyl gallate is substantially dissolved, adding water to the fatty monoglyceride citrate-propyl gallate mix, agitating until the water is substantially dissolved, adding an edible oil to the fatty monoglyceride citrate-propyl gallate-water mixture, and agitating until a substantially clear solution occurs, said resulting solution containing from about 17% to 42½% by weight of the fatty monoglyceride citrate-propyl gallate mix, and from 0.5 to 2.5% by weight of water.

9. The method of claim 8 wherein the edible oil includes a minor proportion of butylated hydroxyanisole.

10. The method which comprises mixing propyl gallate with fatty monoglyceride citrate at a temperature of from about 230–265° F., agitating the resulting mixture until the propyl gallate is substantially dissolved, adding an edible oil to the fatty monoglyceride citrate-propyl gallate mix, agitating until the edible oil is substantially dissolved, adding water to the fatty monoglyceride citrate-propyl gallate-edible oil mixture, and agitating until a substantially clear solution occurs, said resulting solution containing from about 17% to about 42½% by weight of the fatty monoglyceride citrate-propyl gallate mix and 0.5% to 2.5% by weight of water.

11. The method of claim 10 wherein the edible oil contains a minor proportion of butylated hydroxyanisole.

References Cited in the file of this patent

UNITED STATES PATENTS

| 2,677,616 | Hall | May 4, 1954 |
| 2,699,395 | Brown et al. | Jan. 11, 1955 |
| 2,701,203 | Gording et al. | Feb. 1, 1955 |